Patented June 29, 1937

2,085,298

UNITED STATES PATENT OFFICE 2,085,298

PROCESSES FOR BREAKING PETROLEUM EMULSIONS

Melvin De Groote, St. Louis, and Arthur F. Wirtel, Kirkwood, Mo., assignors to Tretolite Company, Webster Groves, Mo., a corporation of Missouri No Drawing. Application September 18, 1936, Serial No. 101,433

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an alkylated naphthalene sulfonic acid in the form of an alkylamino propanol salt of the kind hereinafter described, and additionally characterized by being of the kind in which at least one of the alkyl groups substituted in the naphthalene nucleus contains not less than three carbon atoms and not more than ten carbon atoms. Such compounds are nuclear substituted products.

Commercial demulsifying agents employed for breaking or resolving oil field emulsions include, among other substances, substituted polycyclic aromatic sulfonic acids, or their salts. The type which finds most frequent application is obtained by introducing one, two or more alkyl groups into a naphthalene residue and then producing the sulfonic acid, or the equivalent procedure of alkylating the sulfonic acids. Due to the corrosiveness of the sulfonic acid, it is the usual practice to employ the reagent in the form of a salt, such as ammonium salt, potassium salt, sodium salt, etc.

We have found that if the alkylated aromatic sulfonic acids of the kind previously described are neutralized by means of alkylamino propanols of the kind previously referred to and of the kind which will be hereinafter described in greater detail, one obtains a treating agent or demulsifying agent of unusual effectiveness.

Propanol, or propylene alcohol, without attempting to distinguish between isomeric forms, is described by the type formula $C_3H_7OH$. It is possible to introduce one or more alkylamine groups in propanol, so as to obtain compounds of the kind which, when employed to neutralize alkylated polycyclic sulfonic acids, yield demulsifying agents of excellent quality. In actual practice, such substituted propanols are most readily derived from glycerol, and they may be derived in such a manner that, instead of one residual hydroxyl, there are two residual hydroxyls. Thus, such material, commonly referred to as a "propane diol", may also be referred to, for purpose of convenience, as "hydroxy propanol". Thus, for purposes of classification, and for purposes of simplicity, these products will be referred to as "hydroxy propanols", although in order to indicate that they are the same as appear elsewhere in the literature under the name of diols, the corresponding nomenclature will also be indicated in certain instances.

Reference is made to U. S. Patent No. 2,042,621, dated June 2, 1936, to Olin. This particular patent teaches the production of certain new compositions of matter which are basic in character. These materials will combine with acids such as alkylated naphthalene sulfonic acids, to produce salts. The new compositions of matter described in said Olin patent are formed by reaction of mono- and di-amylamines with glycerol mono- and di-chlorhydrins. They include 1-mono- and di-amyl amino propane-diols and bis mono- and di-amyl amino propanols. These compounds may be considered as derivatives of glycerol having one or more hydroxyl radicals replaced by mono- or di-amyl amino radicals. It is apparent that these products are characterized by the fact that the total number of residual hydroxyl radicals, plus the total number of substituent amino radicals are always equal to three. Among the various examples of such alkylamino propanol derivatives are the following:

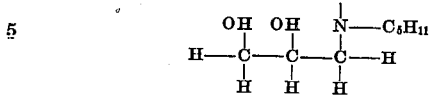

1-mono-amyl amino propane-2,3-diol or
1-mono-amyl amino-2-hydroxy-3-propanol.

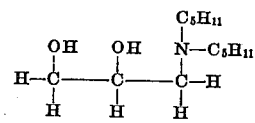

1-di-amyl amino propane-2,3-diol or
1-di-amyl amino-2-hydroxy-3-propanol.

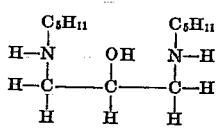

1,3-bis amyl amino-2-propanol

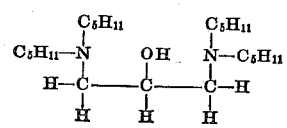

1-3-bis di-amyl amino-2-propanol

These products can be obtained only from either mono-amylamine, or from di-amylamine, or possibly, from their corresponding equivalent functional derivatives. They cannot be obtained from tri-amylamine, insofar that the tertiary amine has no reactive hydrogen atom. When obtained from a mono-amylamine, the amine group —HNC$_5$H$_{11}$ is introduced, and when derived from di-amylamine, the —N(C$_5$H$_{11}$)$_2$ group is introduced. It is to be noted that all the products above described may be derived from glycerol or its halohydrins, as the raw material, and that the final product is substituted only by an amine group of the kind previously described, that is, a group derived from either a mono-alkylamine or a di-alkylamine. For purposes of convenience, the products may be referred to as alkylamino propanol or alkylamino hydroxy propanol, regardless of whether one or two amino residues are introduced, and regardless of whether the amino residue is of the —HNC$_5$H$_{11}$ or —N(C$_5$H$_{11}$)$_2$ type. It is understood that the products are not limited to any particular isomer, but where more than one isomeric form exists, any isomeric form is suitable for the purpose herein indicated. It is evident that it is immaterial how these compounds are produced, and one may employ any suitable reaction, such as a reaction involving a bromhydrin, instead of a chlorhydrin, or perhaps even sulfurin, or similar compounds, if stable enough.

Two molecules of glycerol mono-chlorhydrin can be reacted with one molecule of mono-amylamine to yield to product of the following type:

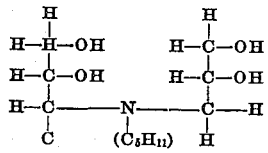

Such a product may be employed very advantageously for neutralization of alkylated polycyclic sulfonic acids employed in the manufacture of the reagent used as the demulsifying agent in the present process.

It is to be noted that the present process employs alkylated naphthalene sulfonic acids of the kind described, which have been neutralized with an alkyl amino propanol, which may be indicated by the following formula:

in which T is an alkyl and m represents the numeral 0 or 1 and n represents the numeral 1 or 2.

If the alkylated naphthalene sulfonic acid in which at least one alkyl group containing at least three carbon atoms and not more than ten carbon atoms has been introduced into the naphthalene nucleus is indicated by the formula: H.D(SO$_3$)$_m$, then the chemical compound used in the present process may be indicated by the type formula:

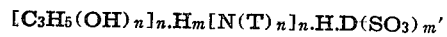

in which $m'$ represents the numeral 1, 2 or 3, and the various other characters have their previous significance.

In the structural illustrations referred to previously, reference has been made to mono-amylamine and di-amylamine, since this alkylamine is available in the open market at a low price. Any other suitable alkylamine, and particularly alkylamines having at least four and not more than eight carbon atoms, are equally suitable. It is known, of course, that the various primary and secondary amines may occur in more than one isomeric form. For instance, the expression "alkylamine" is not intended to differentiate between isomeric forms, as, for example, amylamine where the alkyl group may have a straight chain form or a branched chain form. The most suitable amines are those having at least four and not more than eight carbon atoms. Primary and secondary butylamine, amylamine, hexylamine, heptylamine, and octylamine appear to be the most satisfactory amines for reaction with the glycerol chlorhydrins. Cetylamine may also be used. Other suitable amines are listed in Dictionary of Applied Chemistry, Thorpe, vol. 1, page 188 (1921).

Piperidine (hexahydropyridine) is not a true aliphatic amine from the strictest structural standpoint, but is commonly recognized as having the properties of an aliphatic amine. Hence, it is intended that piperidine be included in the broad classification of alkylamines. Smith, A Textbook of Organic Chemistry, 1932, second edition, revised, p. 646, states as follows: "Whereas, pyridine is a weak tertiary base of aromatic character, piperidine is a strong secondary base, the entire behavior of which classifies it with the aliphatic amines".

The production of reagents of the kind above described need not be obtained from glycerol chlorhydrins, but may also be obtained from glycidol

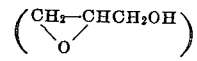

(See Journal American Chemical Society, vol. 52, pp. 1521 and 1528 (1903)). The reactions there described are concerned with glycidol and secondary alkylamines, but the same reaction may be conducted with primary amines, or two molecules of glycidol may be reacted with one molecule of a primary alkylamine. The various di-alkylamino hydroxy propanols described in said article, that is, the di-methyl, di-ethyl, di-normal propyl, di-isopropyl, di-normal amyl and the piperidine amino hydroxy propanols, or amino propane-diols, may be employed to neutralize the alkylated naphthalene sulfonic acids, so as to produce the demulsifying agent employed in the present process.

It is to be noted that the alkylamino propanol can exist in more than one isomeric form, and it is not intended to differentiate between isomers. Furthermore, when such alkylamino propanols are formed with simultaneous liberation of HCl, the chloride or hydrochloride of the alkylamine or alkylamino propanol may be formed, and if so, the base is liberated by reaction with caustic soda solution, caustic potash, or other alkaline solutions.

The reagents which we have found most desirable are 1-mono-amyl amino propane-2,3-diol, and 1-di-amyl amino propane-2,3-dial. Hereinafter reference will be made to 1-mono-amyl amino propane-2,3-diol, but it is understood that any of the similar compounds may be used, if desired.

There does not seem to be any suitable explanation of the unusual superiority of the compounds employed in the present process, that is, alkylamino propanol salts of alkylated naphthalene sulfonic acids of the kind hereinafter described. Similarly, there does not seem to be any basis by which one can anticipate or foresee this unusual effectiveness. Apparently, this marked improvement is not directly related to oil or water solubility, insofar that similar neutralization with other amines may yield compounds which have a greater solubility in oily materials or in water; and yet are not nearly as suitable or effective in their demulsifying action.

Apparently, there is some unlooked-for co-operation or chemical or physico-chemical relationship between the alkylamino propanol type and the sulfo-polycyclic aromatic residue. The neutralization of other conventional acidic demulsifying reagents with alkylamino propanol does not seem to produce any marked improvement over the corresponding sodium or ammonium salts, and in many cases, yields an inferior product, thus indicating that apparently the increased value does not reside in an additive effect, due to the alkylamino propanol residue. If one neutralizes other sulfonic acids, which are known to be effective demulsifying agents, such as petroleum sulfonic acids of the mahogany acid type, with an alkylamino propanol, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the alkylamino propanol and the described sulfo-aromatic residue, in a single molecule, results in an unlooked-for, unique quality, which could not be foreseen by the present knowledge of the art, and which produces a demulsifying agent that is particularly effective for a large number of emulsified crude oils.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene alpha and beta naphthol, etc. In other words, one could introduce the sulfonic acid residue and the alkyl-residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the demulsifying agent contemplated by our process, consists in converting the naphthalene into either the alpha or beta naphthalene sulfonic acid, or a mixture of both, or in some instances, into a di-, or even a tri-sulfonic acid, or a mixture of all the various types. In most instances there is no advantage in introducing more than one sulfonic acid group. In many instances it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as propyl alcohol, butyl alcohol, amyl alcohol, hexyl alcohol, decyl alcohol, etc. is converted into the acid sulfate, such as propyl hydrogen sulfate. The naphthalene sulfonic acid and the alkyl hydrogen sulfate are combined in proportions so that one, two, three, or even four alkyl groups are introduced into the polycyclic aromatic residue. This condensation reaction is generally carried out in the presence of an excess of sulfuric acid. In some instances, the various reactions, such as sulfonation, sulfation, condensation, etc. are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the polycyclic aromatic nucleus, one could also introduce an alkyl residue from some other alcohol, as, for example, an alkylated group derived from ethyl or methyl alcohol, or one might introduce a group derived from an aryl, aralkyl, hydro-aromatic and cyclic alcohol, but regardless of whether or not one introduces such other residues, it is necessary that at least one alkyl residue of the kind described, i. e., having at least three carbon atoms and not more than ten carbon atoms, be introduced into the naphthalene ring. Such compounds having some other residue present, such as a methyl group, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lowest in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the demulsifying agent employed in the present process. For instance, although the sulfonic group may be introduced into either the alpha or beta position, it is manifest that the alkyl group or groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, we prefer to use these alcohols in producing the demulsifying agent used in our process, and in some instances, it is desirable to introduce different alkyl groups, such as propyl group and butyl group, into the same sulfo-naphthalene residue.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with alkylamino propanol in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that we prefer to use in practicing our process is obtained by a reaction in which three moles of isopropyl alcohol are reacted with one mole of naphthalene by the customary sulfation, sulfonation and condensation reactions. The resulting mixture consists largely of di-propyl naphthalene sulfonic acids and tri-propyl naphthalene sulfonic acid, with possibly small amounts of mono-propyl sulfonic acids and tetra-propyl sulfonic acids, and perhaps some di-sulfonic acids present. Generally, speaking, it is easier to conduct the reaction so that the bulk of the sulfonic acid represents the beta type, although the alpha type may be produced, if desired. The product is neutralized with 1-mono amyl amino propane-2,3-diol and is diluted with one or more solvents, so as to reduce its viscosity to that of ordinary castor oil or slightly greater. The solvents which we preferably employ are a mixture of two or more of the following: Water, denatured alcohol, kerosene, or tar acid oil.

Among the reagents which are particularly effective are the alkylamino propanol salts of the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl, di-normal butyl naphthalene sulfonic acids, di-isopropyl, di-normal butyl naphthalene sulfonic acids, di-isopropyl, mono-amyl naphthalene sulfonic acids, mono-isopropyl, mono-hexyl naphthalene sulfonic acids, etc.

It may be desirable to indicate that there is sometimes some variation in nomenclature in regard to the salts derived from strong acids and various amines. For instance, the combination of aniline, and hydochloric acid, is often referred to as aniline hydrochloride. When aniline hydrochloride is treated with caustic soda, aniline is regenerated and sodium chloride is formed. For this reason, and perhaps for other reasons, structural conditions are best expressed by referring to the compound as a hydrochloride, in order to indicate that one does not obtain the chloride of a quaternary ammonium compound. Similarly, the reaction of an alkylamino propanol with a sulfonic acid may be considered as producing the alkylamino propanol salt, although for reasons pointed out, such salt might be looked upon as an alkylamino propanol hydrogen sulfonate, as well as being considered as an alkylamino propanol sulfonate. Insofar that it is perfectly clear as to the chemical composition of the compound, it is immaterial which nomenclature is employed.

In such instances where there is present more than one sulfonic acid group, as in the formation of a di-sulfonic acid, or a tri-sulfonic acid, or a tetra-sulfonic acid, if desired, all the sulfonic acid hydrogens may be neutralized with an alkylamino propanol, or, if desired, only one sulfonic hydrogen may be neutralized with alkylamino propanol, and the other sulfonic hydrogen atom or atoms may be neutralized with some other suitable base, such as sodium hydroxide, potassium hydroxide, ammonium hydroxide, etc.

Alkylamino propanol salts, such as the hydrochloride, may react by double decomposition with alkali sulfonates in a suitable medium to produce the alkylamino propanol sulfonate.

Conventional demulsifying agents employed in the treatment of oil field emulsions are used as such, or after dilution with any suitable solvent such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than alkylamino-propanols.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

It may be desirable to emphasize the fact that for convenience, these products have been referred to as alkylamino propanol salts. The salts so obtained are salts by virtue of the amine acting as a base, thus forming amine sulfonates or amine hydrogen sulfonates, and not by virtue of the hydroxy group of substituted propanol acting as a base. In other words, these products so obtained are not esters in the usual sense, because they are not formed by a reaction involving the hydroxyl of an organic compound and an acidic hydrogen. The simpler ones involving the introduction of only one amine radical may be considered for purposes of illustration only as comparable to a substituted ammonium salt in which one or two hydrogens of the ammonium radical has been replaced by an alkyl group and one hydrogen of the ammonium radical has been replaced by a radical obtained from propanol. The salt formation in all instances is comparable to the union of ammonia and hydrochloric acid, or propylamine and hydrochloric acid.

In the claims it is understood that the word "propanol" includes the substituted hydroxy propanol, as well as propanol, the compound which has only one hydroxyl radical. For convenience, the hydroxy propanols as a specific class will be referred to as diols.

Having thus described our invention, what we claim as new and desire to secure by Letters Patent is:

1. A process for breaking petroleum emulsions of the water-in-oil type, which consists in subjecting the emulsion to the action of a demulsifying agent comprising an alkylamino propanol salt of an alkylated naphthalene sulfonic acid, in which at least one alkyl group substituted in the naphthalene nucleus contains at least three carbon atoms and not more than ten carbon atoms.

2. A process for breaking petroleum emulsions of the water-in-oil type, which consists in subjecting the emulsion to the action of a demulsifying agent comprising a chemical compound of the formula type:

$$[C_3H_5(OH)_n]_n.H_m[N(T)_n]_n.H.D(SO_3)_{m'}$$

in which T is an alkyl radical, $D(SO_3)_{m'}$ is the residue derived from an alkylated naphthalene sulfonic acid in which at least one alkyl group containing at least three carbon atoms and not more than ten carbon atoms has been introduced into the naphthalene nucleus, $m$ represents the numeral 0 or 1, $n$ represents the numeral 1 or 2, and $m'$ represents the numeral 1, 2 or 3.

3. A process for breaking petroleum emulsions of the water-in-oil type, which consists in subjecting the emulsion to the action of a demulsifying agent comprising an amylamino propanol salt of an alkylated naphthalene sulfonic acid, in which at least one alkyl group substituted in the naphthalene nucleus contains at least three carbon atoms and not more than ten carbon atoms.

4. A process for breaking petroleum emulsions of the water-in-oil type, which consists in subjecting the emulsion to the action of a demulsifying agent comprising an amylamino propanol salt of an alkylated naphthalene mono-sulfonic acid, in which at least one alkyl group substituted in the naphthalene nucleus contains at least three carbon atoms and not more than ten carbon atoms.

5. A process for breaking petroleum emulsions of the water-in-oil type, which consists in subjecting the emulsion to the action of a demulsifying agent comprising an amylamino propanol salt of a butylated naphthalene mono-sulfonic acid.

6. A process for breaking petroleum emulsions of the water-in-oil type, which consists in subjecting the emulsion to the action of a demulsifying agent comprising an amylamino propanol salt of amylated naphthalene mono-sulfonic acid.

7. A process for breaking petroleum emulsions of the water-in-oil type, which consists in subjecting the emulsion to the action of a demulsifying agent comprising an amylamino propanol salt of a propylated naphthalene mono-sulfonic acid.

8. A process for breaking petroleum emulsions of the water-in-oil type, which consists in subjecting the emulsion to the action of a demulsifying agent obtained by converting naphthalene into the mono-sulfonic acid; converting propyl alcohol into the acid sulfate; combining said materials in molecular proportions in presence of sulfuric acid as a condensing agent; followed by the conventional washing process and separation of the aqueous waste acid and neutralization of the sulfonic acid by means of 1-mono-amylamino propane-2,3-diol, followed by addition of a suitable solvent.

MELVIN DE GROOTE.
ARTHUR F. WIRTEL.